US011483985B2

(12) United States Patent
Hall (10) Patent No.: US 11,483,985 B2
(45) Date of Patent: Nov. 1, 2022

(54) METHOD AND SYSTEM FOR FUNGI PRODUCTION IN AN AQUAPONICS SYSTEM

(71) Applicant: Sawyer Hall, Rochester, NY (US)

(72) Inventor: Sawyer Hall, Rochester, NY (US)

(*) Notice: Subject to any disclaimer, the term of this patent is extended or adjusted under 35 U.S.C. 154(b) by 0 days.

(21) Appl. No.: 16/940,685

(22) Filed: Jul. 28, 2020

(65) Prior Publication Data
US 2021/0037722 A1 Feb. 11, 2021

Related U.S. Application Data

(60) Provisional application No. 62/883,139, filed on Aug. 6, 2019.

(51) Int. Cl.
| | | |
|---|---|---|
| *A01K 63/04* | (2006.01) | |
| *A01G 18/22* | (2018.01) | |
| *A01G 31/02* | (2006.01) | |
| *A01G 31/00* | (2018.01) | |

(52) U.S. Cl.
CPC .......... *A01G 18/22* (2018.02); *A01G 31/02* (2013.01); *A01K 63/04* (2013.01); *A01G 2031/006* (2013.01)

(58) Field of Classification Search
CPC .. A01G 18/22; A01G 31/02; A01G 2031/006; A01K 63/04; B01D 3/10; B01D 3/011; B01D 3/102; B01D 3/104; B01D 21/02; B01D 24/007; B01D 36/04; C02F 9/00; C02F 1/74
See application file for complete search history.

(56) References Cited

U.S. PATENT DOCUMENTS

| | | | | |
|---|---|---|---|---|
| 4,197,815 A | * | 4/1980 | Brazelton | A01K 13/001 4/491 |
| 8,677,686 B1 | * | 3/2014 | Nelson | A01G 31/02 47/62 R |
| 2004/0107914 A1 | * | 6/2004 | Untermeyer | A01K 63/04 119/215 |
| 2009/0050067 A1 | * | 2/2009 | Parsons | A01K 63/00 705/500 |
| 2015/0289463 A1 | * | 10/2015 | Moriarty | A01G 27/001 47/62 R |

(Continued)

FOREIGN PATENT DOCUMENTS

| | | | | | |
|---|---|---|---|---|---|
| GB | 2520604 A | * | 5/2015 | | C08J 5/18 |
| WO | WO-2016187606 A1 | * | 11/2016 | | A01G 31/02 |
| WO | WO-2019057824 A1 | * | 3/2019 | | A01K 63/04 |

*Primary Examiner* — Monica L Perry
(74) *Attorney, Agent, or Firm* — Andrew Morabito (57) ABSTRACT

The present invention is an aquaponic assembly, comprising at least one tank, wherein the tank is sized to contain a predetermined quantity and species of fish; a radial flow settler connected to the at least one tank, wherein the radial flow settler receives a liquid from the at least one tank, wherein the liquid contains fish excrement and the radial flow settler sorts solid excrement from the liquid; a mineralization system is connected to the radial flow settler, wherein the liquid from the radial flow settler undergoes a mineralization process to adjust the composition of the liquid; a series of liquid beds connected to the mineralization system, wherein the liquid passes through the series of liquid beds; and a plurality of substrates positioned within the liquid beds.

12 Claims, 7 Drawing Sheets

(56) References Cited

U.S. PATENT DOCUMENTS

2017/0188531 A1\* 7/2017 Daniels .................. A01G 7/045
2018/0249649 A1\* 9/2018 Villamar ................ A01G 31/02
2018/0332830 A1\* 11/2018 Gordon ................ B01D 61/025

\* cited by examiner

METHOD AND SYSTEM FOR FUNGI PRODUCTION IN AN AQUAPONICS SYSTEM

CROSS-REFERENCE TO RELATED APPLICATIONS

This application is a continuation (and claims the benefit of priority under 35 USC 120) of U.S. application No. 62/883,139 filed Aug. 6, 2019. The disclosure of the prior applications is considered part of (and is incorporated by reference in) the disclosure of this application.

BACKGROUND OF THE INVENTION

The present invention relates to producing food in an aquaponics system. Typically, an aquaponics system cycles fish waste to feed plants; both fish and plants are harvested for food. The invention is an aquaponics system designed to produce mushrooms in the place of plants in a typical aquaponics system.

Aquaponics systems have been proposed as a sustainable solution to producing healthy food in a world with a changing climate. Fish and vegetables are grown mutualistically, as the plants absorb nutrients from fish feces in water sent from the fish tank to the grow bed, and the plant's absorption of materials from the water cleans the water that is returned to the fish tank. The system can be located in a climate-controlled environment, such as a greenhouse facility.

The primary issue facing the widespread adoption of aquaponics systems is that they are not economically viable in most situation in which they are placed indoors and require artificial light sources. The electricity costs associated with interior lighting and heating often prevent an aquaponics system's profitability from selling produce and fish.

Mushrooms require low to no light to grow. Therefore, if mushrooms could be grown in an aquaponics system, electricity costs associated with interior lighting could be removed, thus increasing the probability of profitability of an aquaponics system.

Many species of mushroom, including white button mushrooms, *Agaricus bisporus*, can grow using the nutrients from decomposing animal feces. Therefore, it is logical that such species of mushrooms could use the nutrients from decomposing fish feces in an aquaponics system to grow.

Mycelium use nutrients from decomposing grain materials in feces. Therefore, the fish will be fed a feed that is high in grain content, a feed that is primarily composed of a grain, such as corn flour, which is the main ingredient in Tetra Pond Sticks®.

The process of mycoremediation involves placing substrates, usually contained in bags, inoculated with mushroom spawn on the sides of waterways so that the mushrooms absorb pollutants from the water, thus cleaning the water and improving its overall quality. Therefore, it is logical that mushrooms could absorb nutrients from the nutrient-rich water flowing through the grow bed in an aquaponics system through abilities similar to those exhibited by mushrooms in mycoremediation.

Mycelium, the non-fruiting part of a mushroom, requires a substrate on which to grow for both structure and for a nutrient source. Common substrates include but are not limited to wood, hay, soil, rock, grains, sawdust, coir, coffee grounds, composted material, manure/feces, vermiculite, and other forms of decomposing organic matter. In an aquaponics system, the water absorbed by the substrate contains the nutrients for the mycelium to absorb, so the mycelium should require the substrate solely for structure on which to grow. Therefore, mycelium growth in and on rockwool would indicate success in the mycelium absorbing nutrients solely from the nutrient-rich water in the aquaponics system. Rockwool is a matrix of hard material (rock) with numerous pores through which mycelium can grow and expand in any direction. It is of complex structure and should accommodate mycelium establishment well. Also, the rockwool used, Grodan Growcubes®, absorbs water from its base to the point where the rockwool is near completely saturated, which is the preferred moisture content in the substrate for mycelium to grow and mushrooms to develop. The mushroom grow bed is also covered by a plastic in order for the above the grow bed to remain very moist as well, which mycelium and mushrooms prefer for growing and developing.

The temperature of the water in the aquaponics system is approximately 75 degrees Fahrenheit, which is the approximately the preferred temperature of most fish species used in aquaponics. 75 degrees Fahrenheit is also the preferred temperature for activation and continuation of mycelium growth and mushroom development because this temperature is approximately the temperature during springtime when mycelium and mushrooms, emerge and develop. This temperature can vary to accommodate for the growth conditions required by various fish and/or mushroom species.

Therefore, it is desired for an aquaponics system that is able to cultivate fungi in a sustainable and low environmental effect system and method.

SUMMARY

The present invention an aquaponic assembly, comprising: at least one tank, wherein the tank is sized to contain a predetermined quantity and species of fish; a radial flow settler connected to the at least one tank, wherein the radial flow settler receives a liquid from the at least one tank, wherein the liquid contains fish excrement and the radial flow settler sorts solid excrement from the liquid; a mineralization system is connected to the radial flow settler, wherein the liquid from the radial flow settler undergoes a mineralization process to adjust the composition of the liquid; a series of liquid beds connected to the mineralization system, wherein the liquid passes through the series of liquid beds; and a plurality of substrates positioned within the liquid beds.

In a second embodiment, the present invention is an aquaponic method for fungi cultivation comprising: providing: at least one tank, wherein the tank is sized to contain a predetermined quantity and species of fish; a radial flow settler connected to the at least one tank, wherein the radial flow settler receives a liquid from the at least one tank, wherein the liquid contains fish excrement and the radial flow settler sorts solid excrement from the liquid; a mineralization system is connected to the radial flow settler, wherein the liquid from the radial flow settler undergoes a mineralization process to adjust the composition of the liquid; a series of liquid beds connected to the mineralization system, wherein the liquid passes through the series of liquid beds; and a plurality of substrates positioned within the liquid beds; inoculating a substrate; placing the inoculated substrate in the series of liquid beds; transferring solid waste from the at least one tank to the series of liquid beds; and transferring said fungi nutrients from the liquid to the series of liquid beds.

DETAILED DESCRIPTION OF THE INVENTION

The present invention provides a solution to the problem facing the widespread adoption of aquaponics systems is that they are not economically viable in most situation in which they are placed indoors and require artificial light sources. The electricity costs associated with interior lighting and heating often prevent an aquaponics system's profitability from selling produce and fish. The present invention is a specialized aquaponics system including apparatuses, methods, techniques, processes, and placements for producing mushrooms and other vegetation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

Figure 1A:
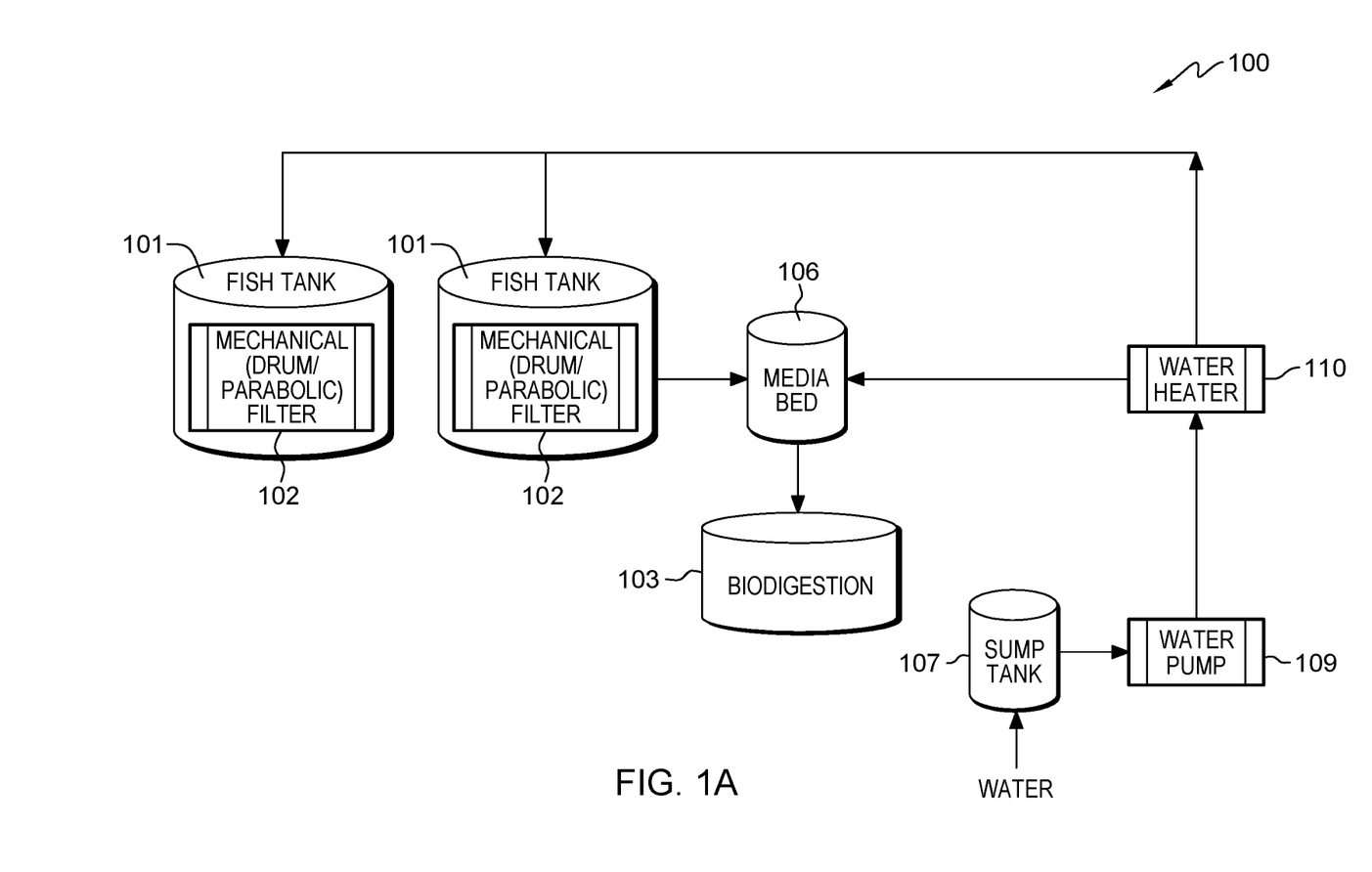
FIG. 1A depicts a diagram of an aquaponics system, in accordance with one embodiment of the present invention.
Figure 1B:
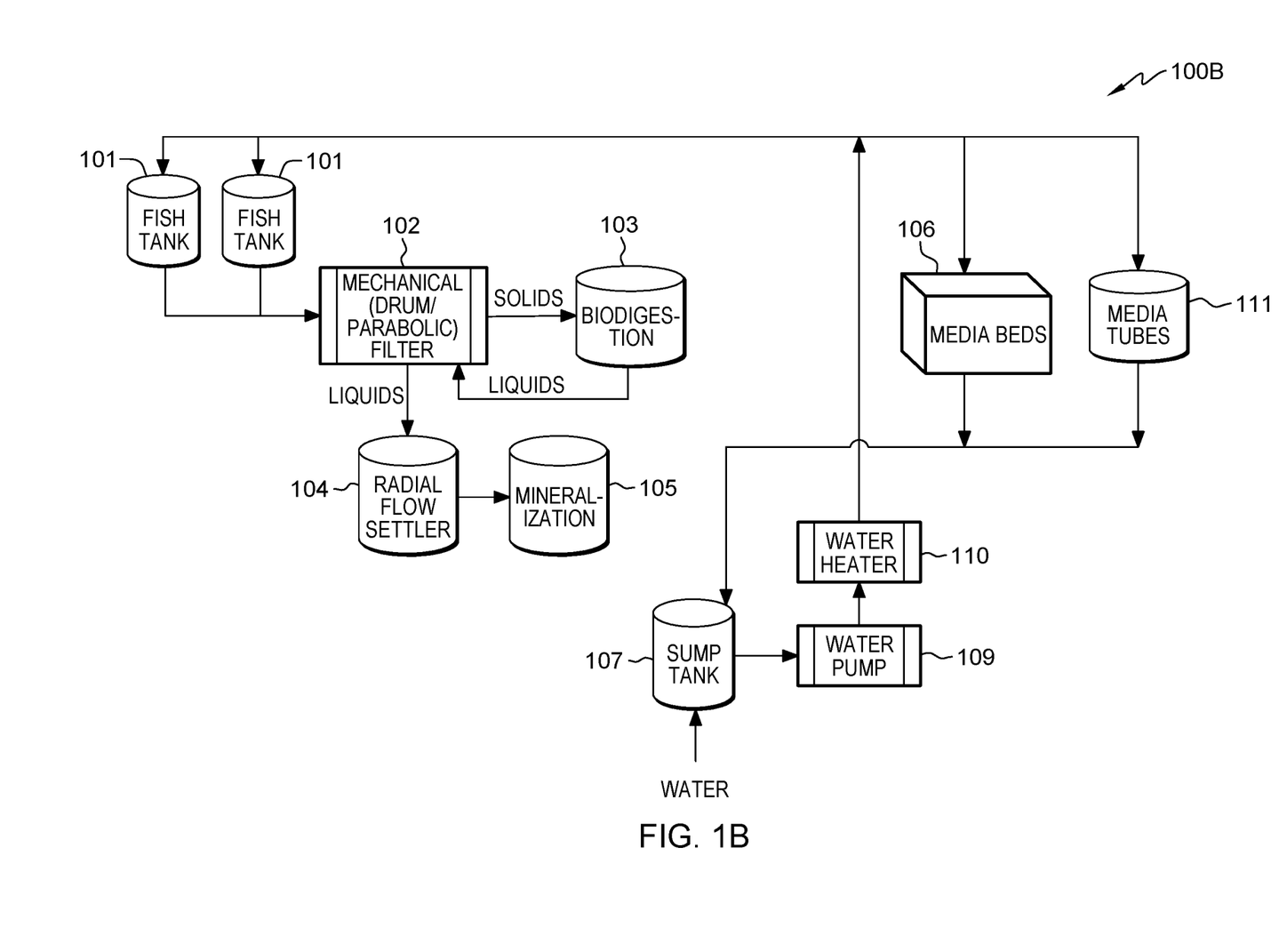
FIG. 1B depicts a diagram of an aquaponics system, in accordance with one embodiment of the present invention.

FIGS. 1A and 1B depicts diagrams of an aquaponics system 100, in accordance with embodiments of the present invention. The present system 100, in a first embodiment, is comprised of fish tanks 101, media beds 106, bio-digestion systems 103, sump tank 107, water pump 109, and a water heater 110.

The fish tanks 101 designed to house the specific quantity and type of fish which is producing the excrement for the bio-digestion system 103. The tanks 101 are of various sizes based on the overall size of the system and the species of fish requirements. The tanks 101 are filled to approximately three inches below the rim with water. A variety of species of fish could be grown in the tanks 101 with maximum stocking density for that species of fish. In some embodiments, there is a submersible pump that constantly pumps water from the fish tank to maintain the proper properties of the water for the fish. The critical aspect of mushroom aquaponics is that the fish must be given a feed that is high in grain and cellulose content. In some embodiments, that feed for mushroom aquaponics is a balanced feed that contains ground grain shucks or husks. The mushrooms require huge amounts of cellulose in the fish feces in order to grow.

The fish tanks 101 have a mechanical filtration system 102 integrated into the fish tanks. The mechanical filtration system provides for the separation of the solid waste produced by the fish that is then transferred to the media beds 106. The mechanical filter 102 provides for the ideal quantity of solid waste to transfer into the media beds 106. In some embodiments, the mechanical filtration system 102 is integrated into the fish tanks 101 when the fish tanks 101 are directly connected to the media beds 106. The mechanical filtration system 102 may be a series of parabolic filter screens or other types of mechanical filtration screens or systems.

The media beds 106 are trays or containers which have a depth of a predetermined height to allow a substrate 112 to be placed within the media bed and have a portion of the substrate submerged under the liquid and a portion extending above the liquid. For example, two or three inches are submerged of a six by six-inch substrate. The media beds 106 have at least one inlet and at least one outlet. The media beds 106 may be in series or in parallel with their connected to the source of the liquid which is passed through the media beds 106. In the depicted embodiment, the media beds 106 are stacked and positioned in series. (FIG. 5) The media beds 106 may have an outlet pipe. In some embodiments the liquid is pumped directly into each media bed 106, or the media beds 106 may be in series based on the type of fungi which is grown and the desired nutritional content of the liquid for the fungi. The media beds 106 may have varying shapes, depths, and designs based on the fungi requirements, and the requirements of the system to provide equal and constant nutrients to all the substrates 112 within the media beds 106.

The media beds 106, in some embodiments, are covered by a clear plastic material 113 or a moisture barrier and a second cover 114 which reduces UV light within the media bed 106 to a level preferred by the type of fungi being cultivated. These covers may be removed independently of one another so as to allow a person to see into the media bed 106, without affecting the moisture or atmospheric properties within the media bed 106.

Placed within the media beds 106 are the substrates 112 which are inoculated with the mycelial spawn. The substrates may be rockwool, grow cubes, or other materials based on the type or genus of fungi being grown. The substrates are based on the absorption and retention of the liquid and the minerals, or nutrients within the liquid. The substrate 112 provide for the proper moisture and surface for the fungi to grow. These substrates 112 may have various designs and formations based on the culture and the fungi in which is being grown.

Integrated into the system 100 where necessary are water pumps 109 and water heaters 110 to provide both a constant flow of water through the fish tanks 101 or the media beds 106. The water heater 110 assists in maintaining an ideal temperature of the water through the various stages of the system 100 based on the desired requirements for the fish and the substrates 112

In some embodiments, the fish tanks 101 are connected to the radial flow settler 104. The flow settler 104 receives the water from the fish tanks 101 and separates the solid excrement from the liquid. The radial flow settler 104 is comprised of a plurality of inlet pipes which are directed into the stilling well, where the water and excrement is pumped into, the more dense excrement are captured in the weir and are released through a solid outlet pipe. The weir has a v-notched top edge to further assist in the separation of the liquid from the solid, wherein the liquid which enters the launder is released through the outlet pipe. The stilling well is positioned substantially within the center of the weir through the use of the supports, which provide for additional overflow redirection. In some embodiments, the fish tanks 101 are connected to the radial flow settler 104 and the media beds 106, wherein the mechanical filtration system directly removes a portion of the solid waste into the media beds 106 and the remaining solid waste is directed to the radial flow settler 104.

The bio-digestion system 103 provides the apparatus and process for anaerobic digestion of the liquid from the media beds 106 or the radial flow settler 104 and production of useful by-products including fertilizer and biogas. The big-digestion system 103 processes the fish excrement contained liquid and adds additional liquid where necessary to create a suspension desired for the specific type of fungi. This process can take over a period of approximately 20 days at a temperature in the range of 20°-55° C. After digestion, the suspension is pumped to a secondary chamber 107 outside of the system for storage. In some embodiments, this includes the further breakdown by mechanical means such as agitation or recirculation, centrifugation to remove suspended solids, production of an enhanced fertilizer by the addition of seaweed, urea, nitrogen, potash and chelated micronutrients, deodorization.

The liquid is then pumped into the mineralization system 105 provides for the further breaking down and recycling of some of the waste product of the organic material and releasing $nh_4^+$. This process is performed by heterotrophic bacteria.

The liquid from the mineralization system 105 is then transferred to the media beds 106 where the liquid is used to provide the feed and nutrients for the fungi to grow. The media beds 106 may have an aeration pump 108 to provide circulation and aggregation of the water to continuously circulate the water for the fungi.

Figure 2A:
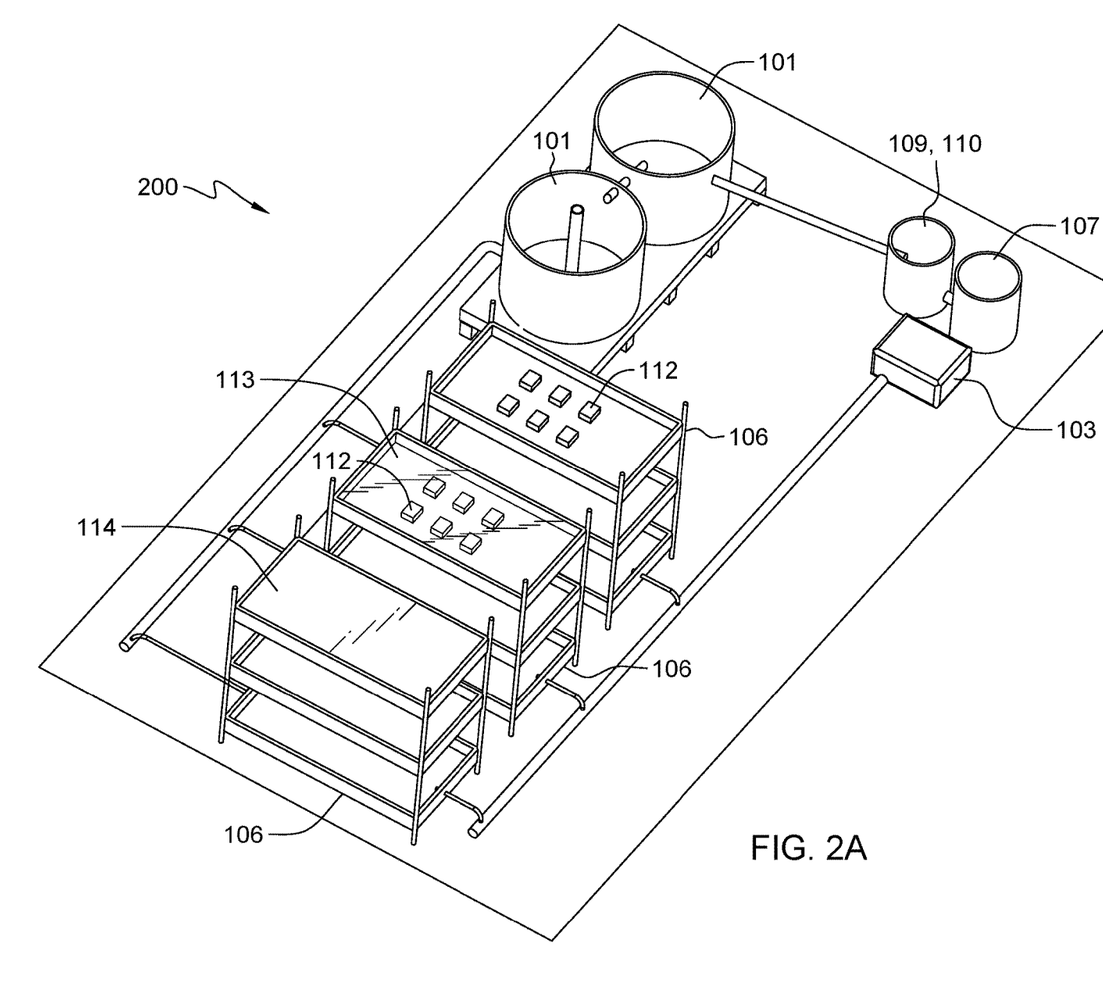
FIG. 2A depicts an illustration of a grow facility, in accordance with one embodiment of the present invention.
Figure 2B:
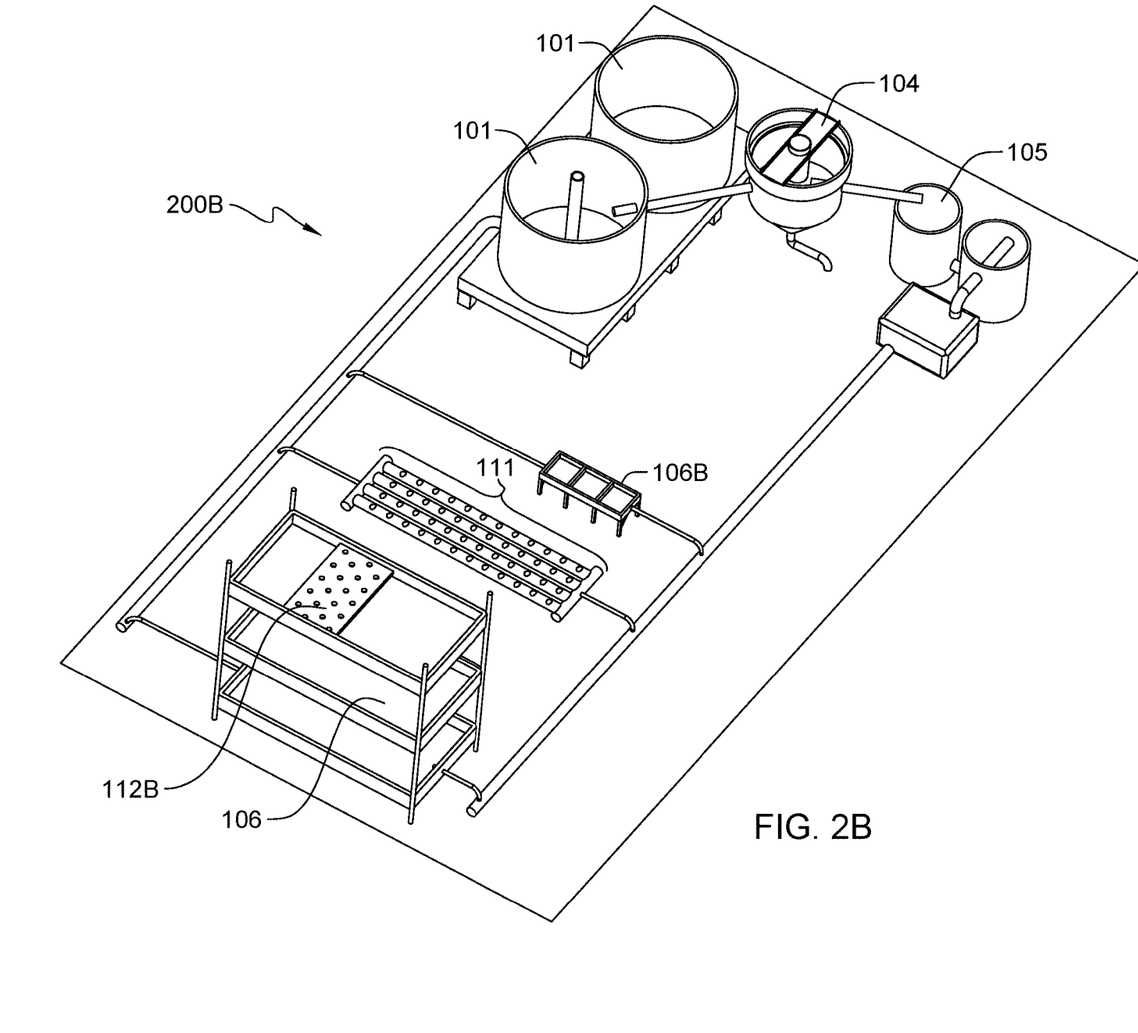
FIG. 2B depicts an illustration of a grow facility, in accordance with one embodiment of the present invention.

In some embodiments, the system 100, as shown in FIG. 2 is contained within a structure 200. The structure provides for protection, humidity and temperature control, the reduction of light from interfering with the cultivating of the fungi. The structure 200 may have various ventilation systems and humidity control systems to maintain a clean working environment and the proper conditions for the fungi.

The system 100 shown in FIGS. 2A and 2B depicted the embodiments of FIGS. 1A and 1B. Showing the fish tanks 101 connected to either the media beds 106 or the radial flow settler 104. In FIG. 2A the media beds 106 show the substrates 112 placed within the media beds 106 partially submerged in liquid. Also, with the clear cover 113 and the UV cover 114 in place. The UV cover 114 permits the transfer of certain light wavelengths, certain amounts of light from the entire spectrum, or the like based on the type of fungi growing, and the ideal amount and type of light which the fungi need to grow. These media beds 106 release the excess liquid into the bio-digestion system 103. The water heater 110 and the water pump 109 are shown sending water into the fish tank 101. In additional embodiments, the fish tanks 101 may be connected to the water heater 109 the water pump 109 and the media beds 106 in parallel or series based on the design.

In FIG. 2B, an alternative setup is shown where the fish tanks 101 are connected to the radial flow settler 104 which separates the liquid from the solid of the fish excrement and forms a liquid to pump into the media beds 106. The excess liquid and solid from the fish tanks 101 are sent to a bio-digestion system 103.

Separate from the media beds 106 are a series of grow beds 113. These grow beds 113 provide for the formation of the fungi or mycelium to be transferred to the substrates 112 or for the formation of the substrates 112. Are for the in some embodiments, the grow beds 106B are also covered by plastic sheets in order to maintain a moist environment, which mycelium and mushrooms prefer for growing and developing. There is a thin, clear plastic sheet directly wrapped around the grow bed 113 to retain moisture and allow for viewing of the growing of mycelium and mushrooms. In some embodiments a black, light-blocking plastic sheet wrapped over the clear sheet to incoming natural light from reaching the mycelium. In some embodiments, the solid waste which is separated in the radial flow settler 104, needs to manually transported to the grow beds 113, media beds 106, or media tubes 111 based on the presence of a transportation system from the radial flow settler 104.

The media tubes 111 provides for long tubes which the substrates 112 are placed within and the liquid is ran through the tubes. This accomplishes the same purpose of exposing the substrates 112 to the liquid but provides for an alternative structural setup based on the fungi requirements and the structure design. Similar to the grow beds 106, the media tubes 111 is directly connected to the fish tanks 101.

Figure 3:
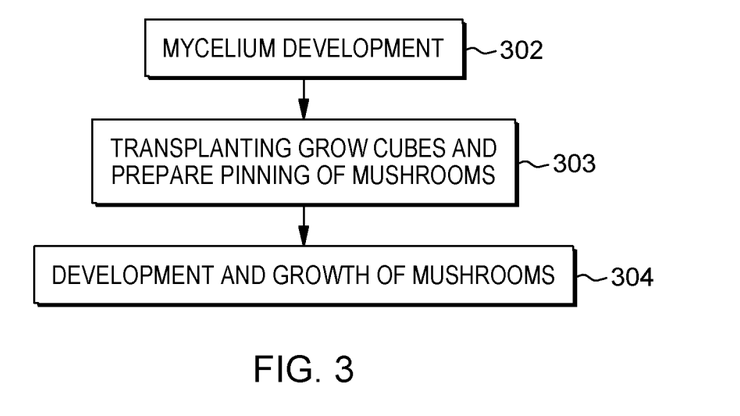
FIG. 3 depicts a flow chart of the phases of the growth of the fungi, in accordance with one embodiment of the present invention.

FIG. 3 depicts a flow chart of the process for the cultivation of the fungi, in accordance with one embodiment of the present invention.

Prior to the placement and preparation of the substrates 112, the media beds 106 are prepared 502 for the quantity of the substrates 112, the type of fungi to be grown.

Figure 4:
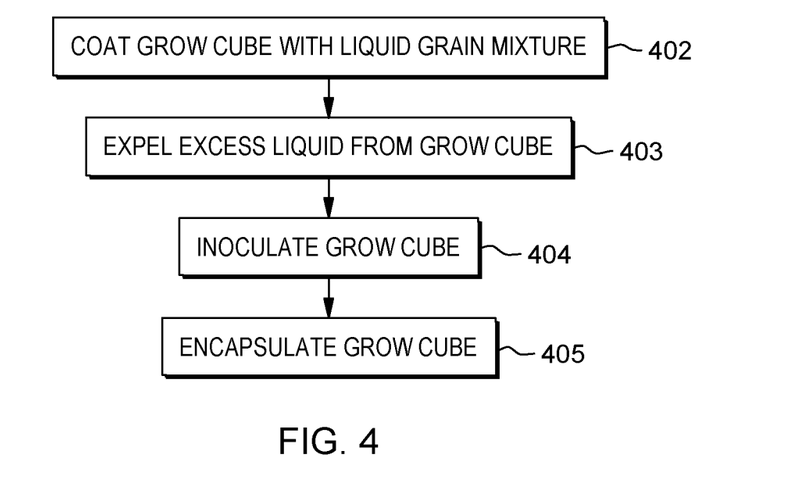
FIG. 4 depicts a flow chart of phase 1 of the growth cycle, in accordance with one embodiment of the present invention.

In phase 1, the mycelium development (302) and colonization on the substrate 112 in the first phase of growing, separate from the aquaponics system 100, the substrates 112 are prepared before transplanting into the system 100. The mycelium colonizes the substrate 112 outside of the aquaponics system 100 to prevent contamination in the early stages of development, where contamination can be most detrimental. It is vital that sterilized conditions are maintained. In some embodiments, the substrates 112 should come sterilized individually wrapped in plastic. Substrates 112 are carefully prepared and placed in a sterilized light blocking container. In some embodiments, the container is large enough to house all the substrates 112 for the media beds 106.

The substrates 112 are then coated in a sterilized liquid grain mixture (402) until the substrate 112 is completely saturated. These are then set aside for approximately 20 minutes or more for the excess sterilized liquid grain to transfer from the substrates 112 (403). (FIG. 4)

Each substrate 112 is inoculated with 10 ml of liquid grain spawn in a syringe by injecting at various locations through the substrate 112 (404). The substrates are then placed within the media beds (503).

The container is encapsulated (405), and apertures are either created in the container or are designed into the container to allow for small amounts of gas exchange. In some embodiments, a cover is placed over the container and is light blocking. The container is left for approximately a month for the mycelium to visibly develop across the substrate 112. Within this container, maintain the following conditions: temperature: 29 degrees Celsius; carbon dioxide: 8,000 ppm; humidity: 90%; light: (no exposure at all/ complete darkness). In additional embodiments these values may be within a tolerance range or adjusted based on the type of fungi which is cultivating.

Figure 5:
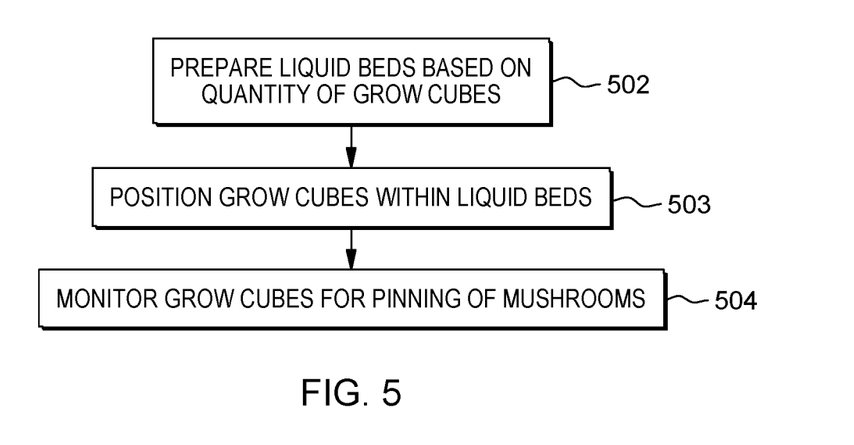
FIG. 5 depicts a flow chart of phase 2 of the growth cycle, in accordance with one embodiment of the present invention.

In phase 2, the substrates 112 are transplanted (303) and prepared for pinning (504) of the mushroom fruits. Before the mycelium-colonized substrates 112 are transplanted, the substrates 112, media beds 106, and the environmental conditions within facility must be prepared. The media beds 106 must be sized appropriately, which depends on the number of fish, size of fish tank, flow rate, and other media beds 106 that may derive effluent from the same fish tank. In some embodiments, the solid fish excrement is deposited directly onto the substrates 112 while in the media beds 106. This is beneficial due to the cellulose contained in the fish excrement. This is accomplished by providing a direct path from the fish tanks 101 to the media beds 106, where the solid fish excrement is permitted entry into the media beds 106, and filtered out before the liquid in the media bed 106 enters the exit piping into the pump. In additional embodiments, the solid fish excrement is harvested from one of the tanks and is directly applied to the substrates 112. The media beds 106 is described above and shown in the previous figures. The mycelium has colonized the substrates 112 completely, so it is less susceptible to detrimental and competing contaminants. Again, under sterilized conditions, transfer the substrates 112 from the container for phase 1 to the media beds 106, spacing them three inches apart on all sides and three inches apart from the walls of the media beds 106. Continue to monitor growth conditions for approximately 18 to 20 days and continue to phase 3 when mushrooms begin to visibly pin and appear to grow across the surface of the substrates 112. Throughout this period, monitor the substrates 112 for any signs of mold, pests, other growths, dark spots, or bugs; if noticed, remove immediately from the substrate 112 with a sterile tool. Throughout this and the following growth phase, aerate the water as much as possible to achieve maximal dissolved oxygen in the water.

The following environmental conditions must be prepared and maintained for this growth stage.

The liquid in the media beds 106: ammonia: 0.00 ppm; nitrite: 0.00 ppm; nitrate: 80 ppm (as high levels as possible without injuring fish). In the environmental conditions: air temperature: 23 degrees Celsius; humidity: 95%; and the carbon dioxide is no longer maintained at a high level for the rest of the mushroom growth phases. In additional embodiments, the various conditions may be modified, adjusted, or acceptable within given tolerances.

In one embodiment, the ratio of one fish tank 101 to one media bed 106 is preferred. This ratio is achieved based on the size of the media beds 106, the number of substrates 112, and the quantity of fish within the fish tanks 101. To maintain that ratio and to convert the volumes of the 6 media beds 106 to the volume of a long mushrooms grow bed, you could use 3 39 inch by 78 inch by 6 inch media beds 106, which would each contain 28 substrates 112.

In some embodiments, the flow rates through the various stages of the system vary based on the desired liquid properties. Through the media beds 106, the desired flow rate is between 800 gph to 1,300 gph. This is however a value based on the 39" by 78" media beds 106. This flow rate is proportional to the size of the media beds 106, the number of substrates 112, and the properties of the liquid.

Figure 6:
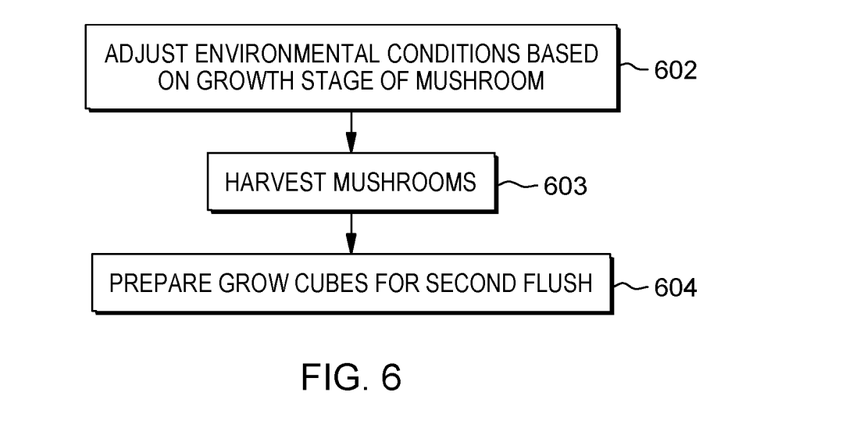
FIG. 6 depicts a flow chart of phase 3 of the growth cycle, in accordance with one embodiment of the present invention.

In phase 3, the final mushroom development (304) and growth. For the final growth phase, only the environmental conditions within the system must be adjusted; the substrates 112 do not need to be moved. The mushroom pins should develop into larger mushrooms relatively rapidly over the course of approximately 10 to 12 days. Again, throughout this period, monitor the substrates 112 for any signs of mold, pests, other growths, dark spots, or bugs; if noticed, remove immediately from the substrate 112. Change the previous environmental conditions within the facility to the following conditions: air temperature: 18.5 degrees Celsius; humidity: 100%; and all other conditions are maintained from phase 2.

When the mushrooms show signs of mature growth for white button mushrooms, including a thicker stem and a slight browning and crossed texture on top of the mushroom cap, cut off (603) the mushroom from the substrate 112 at the base of the stem using sterilized scissors or small knife. Wait another week after harvesting because another set of pins may possibly grow and develop to form mushroom fruits, which is known as a second flush (604), in which case there are two crops of mushrooms from one substrate 112. (FIG. 6)

In order to provide the high levels of ventilation required for Phases 2 and 3 of mushroom growth, the aeration system 109 which exchanges oxygen with the air in the media beds 106. Ventilation could be improved by adding an air exchanging device connected to the media beds 106 by an airtight seal to a flexible plastic covering, with a filter through which outside air is accepted to prevent contamination. It is also possible that the outside air would not have to be filtered if the system in located in a sterile environment.

Since mushrooms absorb most chemical and additives from water extremely efficiently, one could add trace amounts of certain vitamins, minerals, and/or other healthy additives to give the mushrooms highly marketable superior health qualities and benefits, in addition to the potentially superior health benefits of a mushroom grown aquaponically.

In various embodiments, the light, temperature, and humidity are modified over the course of the day to mimic natural growing conditions of mushrooms in the wild.

Figure 7:
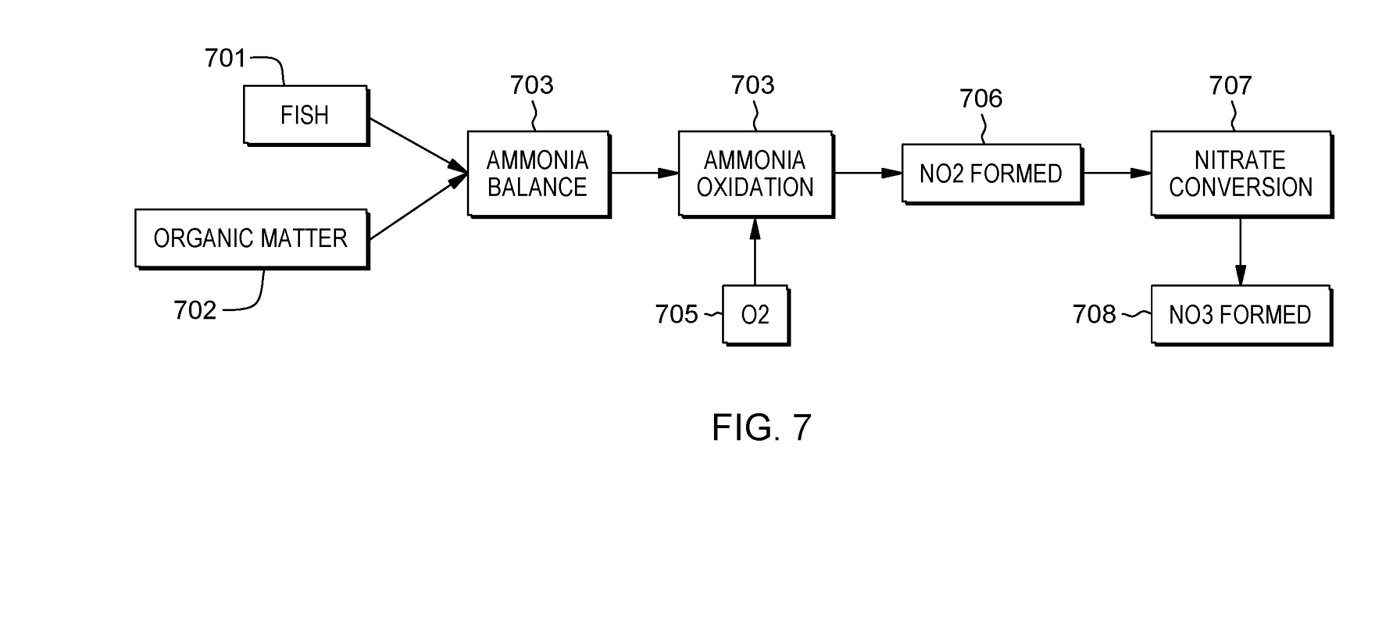
FIG. 7 depicts a flow chart of the nitrification process, in accordance with one embodiment of the present invention.

Referring to FIG. 7, the benefit of aquaponic based systems is the majority of nutrients needed for healthy fungi growth are supplied by the fish (or another organism living in the tank). Additionally, the fungi provide a means of removing contaminants that would cause injury to the fish. Thus, the fungi and the fish are in a symbiotic relationship to help the other.

One of the major nutrients required for healthy plant growth is Nitrogen. In hydroponic systems, Nitrogen is added on a regular basis in the form of liquid fertilizers. However, in aquaponic systems, the nitrogen is supplied from fish waste and other organic matter. Nitrogen is introduced into the system as Ammonia ($NH_3$) and Ammonium ($NH_4+$). The ratio of Ammonia and Ammonium in a system is dependent on several factors, but mainly pH. At lower pH levels, the concentration of Ammonium is greater than the concentration of Ammonia. At higher pH levels, the concentration of Ammonia is higher than the concentration of Ammonium. Controlling pH in an aquaponic system may be important in order to keep the concentration of Ammonia in the system at safe levels for the survival of both the fish 601 and the fungi 611.

Even though Ammonium is not necessarily toxic to either fish or fungi 611, the fungi are not capable of absorbing the nitrogen from the Ammonium in a manner that is productive for healthy fungi 601 growth. In order to provide nutrients to the fungi 611, the Nitrogen must be supplied in the form of Nitrates ($NO_3^-$). Nitrates are formed using a process called Nitrification in which Ammonia is transformed into Nitrates. Nitrification occurs in two steps. The first step, named Ammonia Oxidation, converts Ammonia into Nitrites ($NO_2^-$). In the second step, named Nitrate Conversion, Nitrites are converted into Nitrates ($NO_3^-$)

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. An aquaponic assembly, comprising:
    at least one tank, wherein the tank is sized to contain a predetermined quantity and species of fish;
    a radial flow settler connected to the at least one tank, wherein the radial flow settler receives a liquid from the at least one tank, wherein the liquid contains fish excrement and the radial flow settler sorts solid excrement from the liquid;
    a mineralization system is connected to the radial flow settler, wherein the liquid from the radial flow settler undergoes a mineralization process to adjust the composition of the liquid;
    a series of liquid beds connected to the mineralization system, wherein the liquid passes through the series of liquid beds;
    an aeration pump integrated into the series of liquid beds;
    a plurality of substrates positioned within the liquid beds;
    a heating element, wherein the heating element is connected prior to the series of liquid beds and provides a substantially constant temperature of the liquid to the series of liquid beds; and a system wherein the solid excrement is transferred to the series of liquid beds in a predetermined flow rate based on a flow rate of the liquid through the series of liquid beds.

2. The aquaponic assembly of claim 1, wherein the series of liquid beds have a volume and surface area based on the number of substrates which are desired to be placed within each liquid bed.

3. The aquaponic assembly of claim 1, further comprising, a facility wherein the aquaponic assembly is contained within, and the facility provides a sustainable heat and humidity of the environment surrounding the aquaponic assembly.

4. The aquaponic assembly of claim 1, further comprising, a mechanical filter incorporated into the at least one tank, wherein the mechanical filter is designed to separate solid particulates of a predetermined size.

5. The aquaponic assembly of claim 1, further comprising, a bio-digestion system, wherein the liquid from the at least one tank is stored to convert the solid particulates within the liquid into a fertilizer.

6. The aquaponic assembly of claim 1, further comprising, a sump tank, wherein the liquid from the series of liquid beds is transferred to the sump tank.

7. The aquaponic assembly of claim 6, wherein the liquid from the sump tank is transferred to the at least one tank, wherein a closed system is formed.

8. An aquaponic method for fungi cultivation comprising: providing:
   at least one tank, wherein the tank is sized to contain a predetermined quantity and species of fish;
   a radial flow settler connected to the at least one tank, wherein the radial flow settler receives a liquid from the at least one tank, wherein the liquid contains fish excrement and the radial flow settler sorts solid excrement from the liquid;
   a mineralization system is connected to the radial flow settler, wherein the liquid from the radial flow settler undergoes a mineralization process to adjust the composition of the liquid;
   a series of liquid beds connected to the mineralization system, wherein the liquid passes through the series of liquid beds;
   an aeration pump integrated into the series of liquid beds; and
   a plurality of substrates positioned within the liquid beds;
   a heating element, wherein the heating element is connected prior to the series of liquid beds and provides a substantially constant temperature of the liquid to the series of liquid beds;
   a system wherein the solid excrement is transferred to the series of liquid beds in a predetermined flow rate based on a flow rate of the liquid through the series of liquid beds inoculating a substrate;
   placing the inoculated substrate in the series of liquid beds;
   transferring solid waste from the at least one tank to the series of liquid beds; and
   transferring fungi nutrients from the liquid to the series of liquid beds.

9. The aquaponic method of claim 8, further comprising monitoring the temperature of the liquid.

10. The aquaponic method of claim 8, further comprising controlling the nutrients in the liquid so that the liquid contains at least 80 ppm nitrate.

11. The aquaponic method of claim 8, further comprising, preparing a substrate with a nutrient rich mixture prior to the inoculation.

12. The aquaponic method of claim 8, further comprising directly applying the solid excrement to the substrate.

* * * * *